US010391957B2

United States Patent
Emrani

(10) Patent No.: US 10,391,957 B2
(45) Date of Patent: Aug. 27, 2019

(54) INTEGRATED POWER DISTRIBUTION SYSTEM FOR A VEHICLE

(71) Applicant: Ford Global Technologies, LLC, Dearborn, MI (US)

(72) Inventor: Amin Emrani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 15/091,257

(22) Filed: Apr. 5, 2016

(65) Prior Publication Data
US 2017/0282819 A1    Oct. 5, 2017

(51) Int. Cl.
*B60R 16/00* (2006.01)
*B60R 16/03* (2006.01)
(Continued)

(52) U.S. Cl.
CPC ......... *B60R 16/03* (2013.01); *H01H 85/0241* (2013.01); *H01H 85/46* (2013.01);
(Continued)

(58) Field of Classification Search
CPC .... B06R 16/03; H01H 85/0241; H01H 85/46; H01H 2085/0283; H02H 3/38
(Continued)

(56) References Cited

U.S. PATENT DOCUMENTS 6,717,389 B1 * 4/2004 Johnson ................. H02M 1/15
                                                    323/223
6,771,052 B2 * 8/2004 Ostojic ..................... H02J 1/08
                                                    323/266
(Continued)

FOREIGN PATENT DOCUMENTS

CN      201584806 U     9/2010
CN      101958574 A     1/2011
(Continued)

OTHER PUBLICATIONS

Steven N. Friedman, *Solid-State Power Controllers for the Next Generation*, May 1992, (8 Pages).
(Continued)

*Primary Examiner* — Ryan Jager
(74) *Attorney, Agent, or Firm* — Frank Lollo; Neal, Gerber & Eisenberg LLP; James P. Muraff

(57) ABSTRACT

Embodiments include a vehicle power distribution system comprising a vehicle battery having a nominal voltage; a plurality of electric loads, each load being associated with a rated voltage; and an integrated circuit coupled to the vehicle battery and comprising a plurality of solid-state circuitry blocks respectively coupled to the electric loads, each block including a circuit protection system and configured to supply the rated voltage associated with the electric load coupled to the block. Embodiments also includes a vehicle power distribution module comprising an integrated circuit configured to receive a first voltage from a vehicle battery and to supply respective rated voltages to a plurality of electric loads, the integrated circuit comprising a plurality of solid-state circuitry blocks, and each circuitry block including a circuit protection system and being coupled to a respective one of the electric loads.

12 Claims, 2 Drawing Sheets

(51) Int. Cl.
*H01H 85/02* (2006.01)
*H01H 85/46* (2006.01)
*H02H 3/38* (2006.01)
*H02H 3/10* (2006.01)
*H02H 3/20* (2006.01)
*H02H 3/00* (2006.01)

(52) U.S. Cl.
CPC .............. *H02H 3/10* (2013.01); *H02H 3/202* (2013.01); *H02H 3/38* (2013.01); *H01H 2085/0283* (2013.01); *H02H 3/006* (2013.01)

(58) Field of Classification Search
USPC .......................................................... 307/9.1
See application file for complete search history.

(56) References Cited

U.S. PATENT DOCUMENTS

| | | | | |
|---|---|---|---|---|
| 6,864,670 | B2* | 3/2005 | Ouyang, Jr. | H02M 3/00 323/271 |
| 6,936,999 | B2* | 8/2005 | Chapuis | H02J 1/08 323/282 |
| 7,080,265 | B2* | 7/2006 | Thaker | H02J 1/08 363/74 |
| 7,161,782 | B2 | 1/2007 | Juntunen et al. | |
| 7,629,712 | B2* | 12/2009 | Nakashima | H02J 1/08 307/126 |
| 7,656,634 | B2 | 2/2010 | Robertson et al. | |
| 7,673,157 | B2* | 3/2010 | Chapuis | G06F 1/189 323/371 |
| 7,882,372 | B2* | 2/2011 | Chapuis | G06F 1/189 323/371 |
| 8,570,699 | B2 | 10/2013 | Shaya et al. | |
| 9,746,861 | B2* | 8/2017 | Perier | G05F 1/46 |
| 2004/0201279 | A1* | 10/2004 | Templeton | H02J 1/102 307/11 |
| 2004/0246754 | A1* | 12/2004 | Chapuis | H02J 1/08 363/89 |
| 2005/0120251 | A1* | 6/2005 | Fukumori | G06F 1/30 713/300 |
| 2005/0182991 | A1* | 8/2005 | Kawakubo | G06F 1/30 714/54 |
| 2006/0200688 | A1 | 9/2006 | Tofigh et al. | |
| 2010/0039055 | A1* | 2/2010 | Jeung | H02P 6/00 318/400.08 |
| 2012/0007425 | A1 | 1/2012 | Rozman et al. | |
| 2014/0265560 | A1* | 9/2014 | Leehey | B60L 1/003 307/10.1 |
| 2015/0076900 | A1 | 3/2015 | Johannsen | |
| 2015/0323945 | A1* | 11/2015 | Perier | G05F 1/46 307/31 |

FOREIGN PATENT DOCUMENTS

CN 202524293 U 11/2012
GB 2546386 A 7/2017

OTHER PUBLICATIONS

Data Device Corporation, *Next Generation Solid State Power Controllers* (2 Pages) Bohemia, New York.
Search Report dated Sep. 19, 2017, for Great Britain Patent Application No. GB1704410.8 (3 Pages).

* cited by examiner

INTEGRATED POWER DISTRIBUTION SYSTEM FOR A VEHICLE

TECHNICAL FIELD

This application generally relates to vehicle power distribution boxes or modules and more specifically, to an integrated power distribution system with programmable output voltages and configurable fault protection.

BACKGROUND

Existing vehicles typically include low voltage power distribution systems to power a wide variety of vehicle components and accessories. For example, automotive vehicle applications may include a 12 volts (V) power distribution system to power vehicle control modules, such as a powertrain controller, body controller, battery controller, and the like, as well as vehicle lighting, HVAC, windows, mirrors, wipers, infotainment system, navigation system, and countless other systems, motors, actuators, sensors, and modules. The increasing demands on vehicle power distribution systems are nearing the practical limits of existing 12 V systems. As a result, the automotive industry has been moving towards using higher voltage levels, such as 48 V. However, certain vehicle accessories, components, or devices may not be compatible with a new, higher voltage. Thus, any new power distribution system must be able to accommodate higher voltage loads as well as lower voltage loads.

SUMMARY

The invention is intended to solve the above-noted and other problems by providing an integrated power distribution system for a vehicle that can be programmed to supply an appropriate output voltage to each of a plurality of electric loads and set over-current and over-voltage limits for each load according to the load's specifications.

For example, one embodiment includes a vehicle power distribution system comprising a vehicle battery having a nominal voltage; a plurality of electric loads, each load being associated with a rated voltage; and an integrated circuit coupled to the vehicle battery and comprising a plurality of solid-state circuitry blocks respectively coupled to the electric loads, each block including a circuit protection system and configured to supply the rated voltage associated with the electric load coupled to the block.

Another example embodiment includes a vehicle power distribution module comprising an integrated circuit configured to receive a first voltage from a vehicle battery and to supply respective rated voltages to a plurality of electric loads, the integrated circuit comprising a plurality of solid-state circuitry blocks, and each circuitry block including a circuit protection system and being coupled to a respective one of the electric loads.

As will be appreciated, this application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
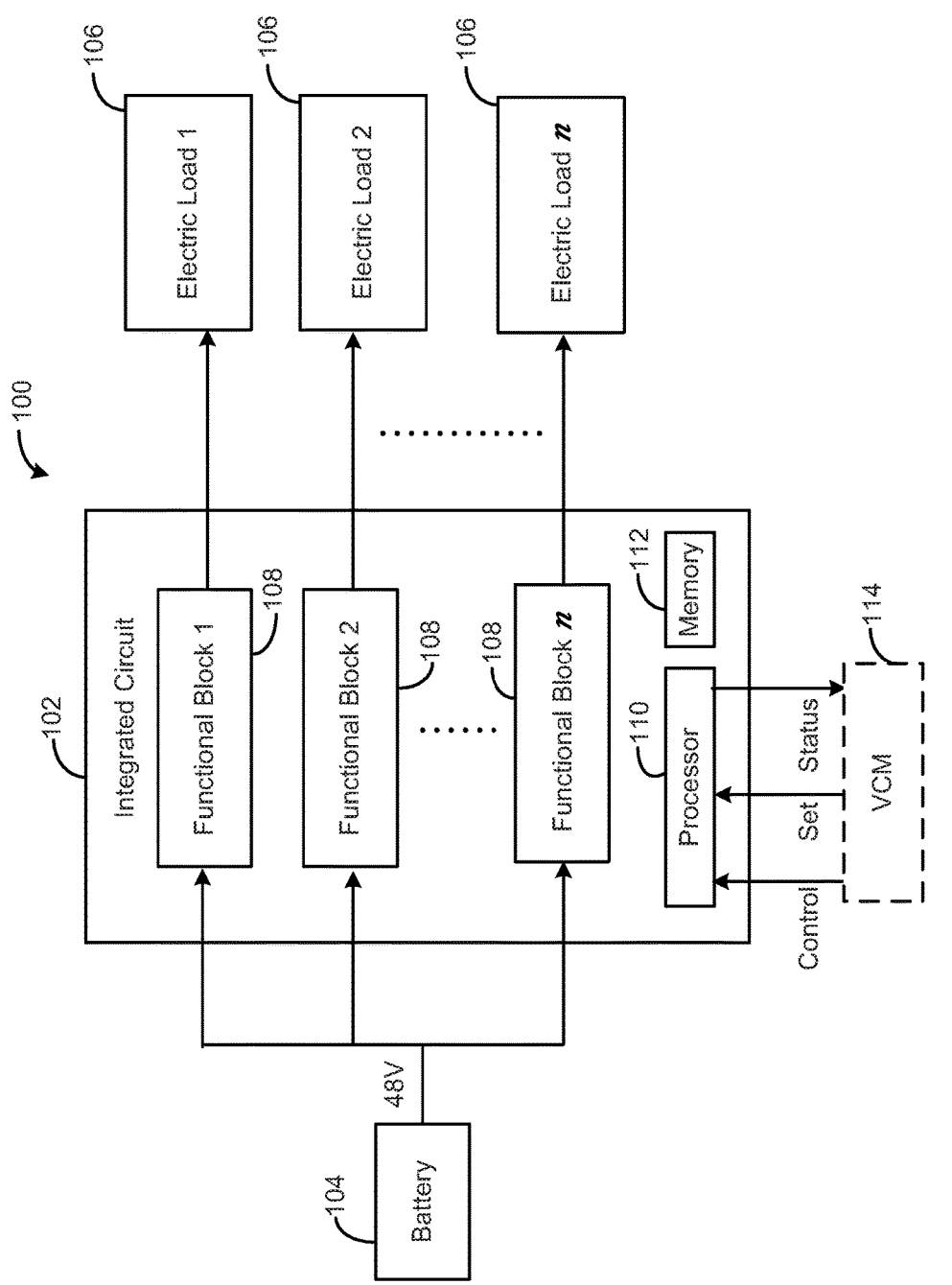
FIG. 1 depicts an example integrated power distribution system for a vehicle, in accordance with embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an exemplary integrated power distribution system 100 for use in a vehicle, in accordance with embodiments. The system 100 (also referred to herein as a "vehicle power distribution system") may be implemented in any suitable type of vehicle (not shown), such as an electric vehicle, hybrid electric vehicle (HEV), plug-in electric vehicle (PHEV), or battery electric vehicle (BEV). As illustrated, the integrated power distribution system 100 includes an integrated circuit 102 coupled to a battery 104 and a plurality of electric loads 106. In some embodiments, the integrated circuit 102 may be included in a vehicle power distribution box or module (not shown) with a housing to protect the circuit 102 from moisture, dust, and other environmental factors.

According to embodiments, the battery 104 may be an auxiliary battery having a nominal voltage, such as, for example, 48 V or higher. As understood by those of ordinary skill in the art, the actual voltage supplied by the battery 104 will vary during operation depending on a number of ambient and operating conditions such as temperature, battery charge, current, battery age, etc. The battery 104 may also be referred to as a low-voltage battery, starter battery, or simply, the vehicle battery, for example, in vehicles without a high-voltage traction battery.

The battery 104 may be used to power various low-voltage components, controllers, modules, motors, actuators, sensors, lights, and other electronics from various vehicle systems and subsystems. In FIG. 1, these various devices are generally represented as the electric loads 106.

Each electric load 106 can be associated with a rated voltage or supply voltage that is the same as or different from the nominal voltage of the battery 104. For example, a number of the electric loads 106 may have rated voltages that are the same as the nominal voltage (e.g., 48 V), while the remaining electric loads 106 may have rated voltages that are less than the nominal voltage (e.g., 6 V, 12 V, 24 V, etc.).

The integrated circuit 102 may be a monolithic integrated circuit or chip having one or more input pins connected to the battery 104 and, in some cases, another power supply (not shown), and a plurality of output pins respectively connected to the plurality of electric loads 106. Moreover, as shown in FIG. 1, the integrated circuit 102 includes a plurality of functional blocks 108. According to embodiments, each block 108 is coupled to, or feeds power to, a respective one of the electric loads 106. As such, the total number of functional blocks 108 within the integrated circuit 102 can vary depending on the number of electric loads 106 coupled to the integrated circuit 102 and/or an available number of output pins on the integrated circuit 102.

According to embodiments, each functional block 108 (also referred to herein as "solid-state circuitry blocks") can include solid-state circuitry for providing fault protection, for supplying the rated voltage associated with the electric load 106 coupled to the block 108, and for switching the electric load 106 on and off, as needed. For example, each functional block 108 can include an electronic fuse comprising a solid-state power switch (e.g., field-effect transistor (FET)) and integrated fault sensing circuitry, an integrated step-down converter for converting the nominal voltage to a lower rated voltage, as needed, and/or an electronic controller for setting the output voltage of the step-down converter and/or for controlling operation of the electronic fuse. More detail about the content of the functional blocks 108 will be described below with respect to FIGS. 2-5.

In embodiments, the exact configuration of each functional block 108 can vary depending on the device specifications for the electric load 106 coupled thereto. For example, when designing the integrated circuit 102, the contents of each functional block 108 can be selected based on whether the associated electric load 106 (1) needs to be connected to the battery 104 at all times, (2) requires frequent on/off cycles, (3) requires a constant output voltage, (4) has a rated voltage that is less than the nominal voltage of the battery 104, or any other device specifications relevant to determining the power supply needs of the electric load 106. As will be appreciated, if all of the electric loads 106 have identical device specifications, all of the functional blocks 108 may be identical as well. Conversely, if each of the electric loads 106 has different device specifications, each of the functional blocks 108 may be different.

As shown in FIG. 1, the integrated circuit 102 can further include a processor 110 for controlling and monitoring operation of the integrated circuit 102. More specifically, the processor 110 can be configured to control an output voltage, set and monitor fault condition limits, and control other operations of each functional block 108. In some cases, the processor 110 can also monitor an overall condition of the system 100 and/or the integrated circuit 102 in order to optimize system performance, for example, by identifying conditions that could lead to potential power savings. To carry out these and other functions, the processor 110 can be configured to receive and/or transmit signals via select input pins (e.g., control and set) and an output pin (e.g., status) of the integrated circuit 102, as shown in FIG. 1

More specifically, the processor 110 can be coupled to an input control pin for receiving control messages for setting an output voltage of one or more functional blocks 108, switching one or more electric loads 106 on or off, and/or other actions. The processor 110 can also be coupled to an input set pin for receiving fault condition limits for one or more of the functional blocks 108. In addition, the processor 110 can be coupled to an output status pin for outputting status messages regarding a fault condition of the functional blocks 108 and/or the integrated circuit 102 as a whole. As shown in FIG. 1, the control, set, and status pins can be coupled to an external source, such as, for example, a vehicle control module (VCM) 114 or other component of the vehicle that can accept user inputs for programming the output voltage and/or the fault condition limits of select functional blocks 108 and can provide status messages to a user interface (not shown) of the vehicle or other vehicle system.

In embodiments, the processor 110 can comprise one or more of a microprocessor, a microcontroller, a programmable logic array, an application-specific integrated circuit, a logic device, or other electronic device for processing, inputting, outputting, manipulating, storing, or retrieving data. The processor 110 can be configured to execute software stored within a memory 112 of the system 100, to communicate data to and from the memory 112, and to generally control operations of the integrated circuit 102 pursuant to the software.

The memory 112 can be included in the integrated circuit 102 along with the processor 110, or can be separate from the integrated circuit 102, for example, when the processor 110 is included in the VCM 114, as shown in FIG. 1. The memory 112 can comprise one or more of electronic memory, nonvolatile random access memory (e.g., RAM), flip-flops, a computer-writable or computer-readable storage medium, or other electronic device for storing, retrieving, reading, or writing data.

The memory 112 is configured to store executable software, some of which may or may not be unique to the system 100. The software in memory 112 may include one or more separate programs, each comprising an ordered listing of machine readable instructions that, when executed by processor 110, cause the processor 110 to perform various acts and/or implement logical functions. As an example, the software in memory 112 may include software instructions for setting fault condition limits for each functional block 108 in accordance with data received via the set pin of the integrated circuit 102, monitoring a fault status of each functional block 108 and outputting said fault status via the status pin of the integrated circuit 102, controlling operation of each functional block 108 in accordance with control messages received via the control pin of the integrated circuit 102, setting an output voltage for one or more of the functional blocks 108 in accordance with a user-selected voltage value received via the control pin.

FIGS. 2-5 depict various example circuitry blocks 200, 300, 400, and 500 for forming one or more of the functional blocks 108 shown in FIG. 1, in accordance with embodiments. That is, each functional block 108 of the integrated circuit 102 can contain one of the circuitry blocks 200, 300, 400, and 500. An input of each circuitry block 200, 300, 400, and 500 can be coupled to a power source, such as the battery 104 shown in FIG. 1, or otherwise receive an input voltage from the power source. In addition, an output of each circuitry block 200, 300, 400, and 500 can be coupled to a select one of the vehicle electric loads 106 shown in FIG. 1. The exact circuitry block selected for a given functional block 108 can depend on the device specifications of the electric load 106 coupled to the functional block 108.

In the following paragraphs, key components of the circuitry blocks 200, 300, 400, and 500 will be described. However, it should be understood that any circuit or other electrical device disclosed herein may include any number of discrete passive and active components that are not explicitly listed herein, such as, for example, resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof), and software which cooperates with one another to perform operation(s) disclosed herein.

Figure 2:
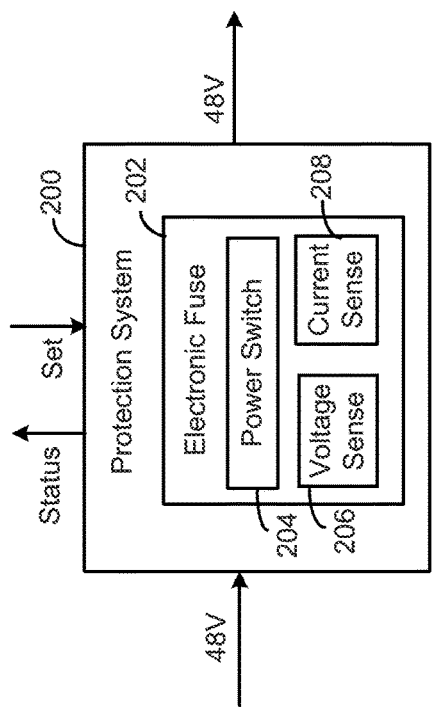
FIG. 2 depicts an example circuitry block included in the power distribution system of FIG. 1, in accordance with certain embodiments.

Referring now to FIG. 2, shown is an exemplary circuitry block 200 comprising only a circuit protection system configured to protect the power source, the electric load, and an internal power switch. In a preferred embodiment, the circuitry block 200 may be used to protect electric loads that are required to be connected to the power source (or battery) at all time and have a rated or supply voltage that is compatible with the nominal or input voltage received from the power source, for example, as shown in FIG. 2.

As shown, the circuit protection system 200 includes a resettable electronic fuse 202 that comprises a solid-state power switch 204 for selectively energizing or powering the electric load coupled to the output of the circuitry block 200. In embodiments, the power switch 204 can be, for example, a field-effect transistor (e.g., MOSFET), a gallium nitride (GaN) transistor, or other fast-switching semiconductor devices. The electronic fuse 202 further includes voltage sense circuitry 206 and current sense circuitry 208 for monitoring a performance of the electronic fuse 202 and providing over-voltage and over-current protection, respectively. For example, the voltage sense circuitry 206 can be configured to monitor an input to the power switch 204 for an over-voltage fault condition and if needed, deactivate or de-energize the power switch 204. Similarly the current sense circuitry 208 can be configured to monitor an output of the power switch 204 for an over-current fault condition and if needed, deactivate the power switch 204. Though not shown, the electronic fuse 202 may also include additional sensors for detecting other fault conditions, such as, for example, a temperature level of the power switch 204.

As shown, the circuitry block 200 further includes an input set pin for receiving fault condition limits from the processor 110, including, for example, over-voltage and over-current limits. The fault condition limits may be set according to the device specifications of the electric load coupled to the circuitry block 200. As also shown, the circuitry block 200 also includes an output status pin for outputting fault condition status messages to the processor 110. The status messages may be generated by the voltage sense circuitry 204 and/or the current sense circuitry 206 in the event of a fault condition.

Figure 3:
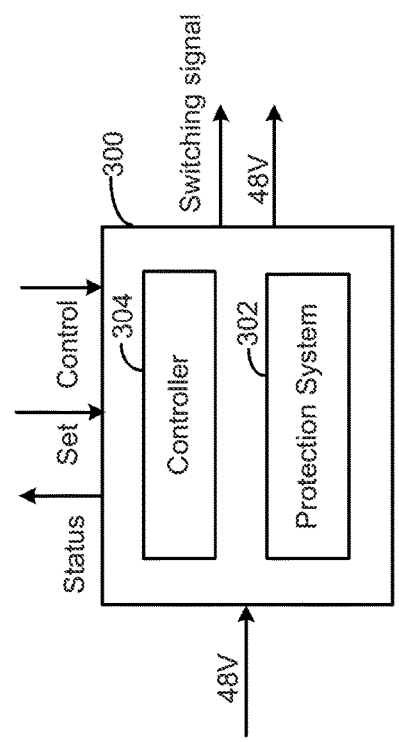
FIG. 3 depicts another example circuitry block included in the power distribution system of FIG. 1, in accordance with certain embodiments.

FIG. 3 depicts an exemplary circuitry block 300 comprising a circuit protection system 302 for protecting the power source, the electric load, and an internal power switch, and a controller 304 comprising control logic for controlling operation of the protection system 302. In embodiments, the circuit protection system 302 comprises a resettable electronic fuse (not shown) that is substantially similar to the protection system 200 shown in FIG. 2 and described above. Likewise, the circuitry block 300 includes an input set pin and an output status pin that are substantially similar to the input set pin and the output status pin of the circuitry block 200 shown in FIG. 2 and described above.

In a preferred embodiment, the circuitry block 300 may be used to protect electric loads that require frequent on and off cycles, and have a rated or supply voltage that is compatible with the nominal or input voltage received from the power source, for example, as shown in FIG. 3. As such, the controller 304 may be configured to provide a switching signal for turning the electric load 106 on and off, as needed. As shown in FIG. 3, the circuitry block 300 can include an input control pin for receiving control messages that control generation of the switching signal or otherwise control a switching operation of the electronic fuse within the protection system 302.

Figure 4:
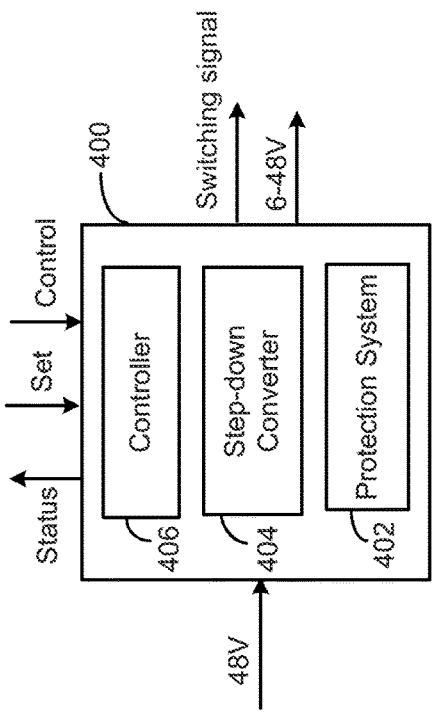
FIG. 4 depicts yet another example circuitry block included in the power distribution system of FIG. 1, in accordance with certain embodiments.

FIG. 4 depicts an exemplary circuitry block 400 comprising a circuit protection system 402 for protecting the power source, the electric load, and an internal power switch, a step-down converter to convert, or step down, the input voltage to the supply voltage required by the electric load, and a controller comprising control logic for controlling operation of the components of the circuitry block 400. In some embodiments, the circuitry block 400 comprises the vehicle power distribution circuitry with integrated voltage converter disclosed in commonly owned U.S. patent application Ser. No. 14/957,937, filed on Dec. 3, 2015, which is incorporated by reference herein in its entirety.

In embodiments, the circuit protection system 402 comprises a resettable electronic fuse (not shown) that is substantially similar to the protection system 200 shown in FIG. 2 and described above. Likewise, the circuitry block 400 includes an input set pin and an output status pin that are substantially similar to the input set pin and the output status pin of the circuitry block 200 shown in FIG. 2 and described above.

In a preferred embodiment, the circuitry block 400 may be used to protect electric loads that have a rated voltage that is lower than the input or nominal voltage of the power source. However, as will be appreciated, the circuitry block 400 may also be used to protect electric loads with a rated voltage that is compatible with or equal to the input voltage by either bypassing the step-down convertor 404 or configuring the step-down converter 404 to apply no voltage reduction.

In embodiments, the step-down converter 404 (also referred to as a "step-down switching regulator") can be a solid-state DC-DC buck converter or other switching regulator with a wide input voltage range and a programmable output voltage that can be set to the rated voltage of the electric load coupled to the circuitry block 400. The circuitry block 400 includes an input control pin for receiving a control message for setting the output voltage of the step-down converter 404. The controller 406 can be configured to receive the control input and control the output voltage of the step-down convertor 404 based on the control input. In embodiments, the output voltage of the step-down convertor 404 may be user-configured using an external input device. For example, the control message may be based on a user input, received via, for example, a user interface of the vehicle control module or other vehicle system, for controlling the output voltage of the circuitry block 400. Thus, the controller 406 of the circuitry block 400 can be configured for setting a user-programmable output voltage, as well as programmable fault condition limits, and for monitoring switching performance.

Figure 5:
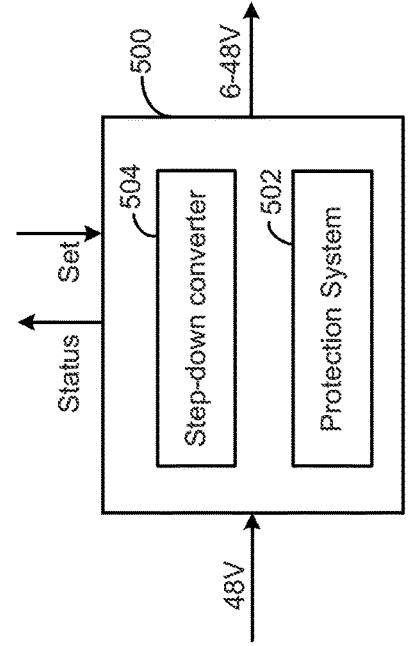
FIG. 5 depicts still another example circuitry block included in the power distribution system of FIG. 1, in accordance with certain embodiments.

FIG. 5 depicts an exemplary circuitry block 500 comprising a circuit protection system 502 for protecting the power source, the electric load, and an internal power switch, and a step-down converter 504. In embodiments, the circuit protection system 502 comprises a resettable electronic fuse (not shown) that is substantially similar to the protection system 200 shown in FIG. 2 and described above. Likewise, the circuitry block 500 includes an input set pin and an output status pin that are substantially similar to the input set pin and the output status pin of the circuitry block 200 shown in FIG. 2 and described above.

In a preferred embodiment, the circuitry block 500 may be used to protect electric loads that need a constant output voltage that is lower than the input or nominal voltage of the power source, as shown in FIG. 5. As a result, the step-down converter 504 may not be used to have a programmable output voltage, as described above with respect to FIG. 4. Instead, the step-down converter 504 may be used to implement a closed-loop control system that is set to provide a constant output voltage that is lower than the input or nominal voltage of the power source. In embodiments, the step-down converter 504 can be a solid-state DC-DC buck converter or other appropriate switching regulator.

Thus, the disclosure provides an integrated power distribution system comprising a monolithic integrated circuit for implementing a vehicle power supply that can feed a plurality of vehicle electric loads, can provide a programmable output voltage to select electric loads, as needed, and can provide configurable over-current and over-voltage protection to each electric load. Using a monolithic chip to implement the vehicle power distribution system described herein not only saves space and reduces the weight and size of the power distribution box, but also provides high system flexibility and functionality and optimizes the wiring system. For example, the components of the integrated circuit can be arranged into a plurality of functional or circuitry blocks that are each assigned to a separate electric load and can be individually configured according to the fault condition limits and rated voltage of the load connected to it. Each functional block can include solid-state power switches (e.g., FETs) and intelligence (e.g., electronic controllers and sensors) for providing resettable electronic circuit protection and monitoring configured to the device specifications of each electric load. In addition, select functional blocks can be configured to accommodate higher voltage electric loads having a rated voltage that is compatible with a higher voltage power source (e.g., a 48 V battery), while other functional blocks can include an integrated step-down converter, as needed to accommodate legacy electric loads having a rated voltage that is lower than the higher voltage.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle power distribution system, comprising:
 a battery having a nominal voltage;
 electric loads, each load being associated with a rated voltage; and
 an integrated circuit coupled to the battery and comprising:
 a processor configured to generate a switching signal; and
 solid-state circuitry blocks respectively coupled to the electric loads, the solid-state circuitry blocks comprising a first block comprising:
 a controller configured to turn-off the electric load coupled to the first block in response to the switching signal; and
 a resettable electronic fuse configured to supply the rated voltage associated with the electric load coupled to the block.

2. The system of claim 1, wherein the electronic fuse comprises a power switch, and wherein the power switch is a field-effect transistor.

3. The system of claim 1, wherein the electronic fuse further includes voltage sense circuitry and current sense circuitry for monitoring a performance of the electronic fuse.

4. The system of claim 1, wherein at least one of the circuitry blocks further includes a step-down converter to step down the nominal voltage to the rated voltage of the electric load coupled to the at least one of the circuitry blocks.

5. The system of claim 4, wherein the at least one of the circuitry blocks further includes a controller configured to control an output voltage of the step-down converter based on a user input.

6. The system of claim 1, wherein the nominal voltage is 48 volts.

7. The system of claim 1, wherein the rated voltage of at least one of the electric loads is less than the nominal voltage.

8. The system of claim 1, wherein the rated voltage of at least one of the electric loads is equal to the nominal voltage.

9. A vehicle power distribution module, comprising:
 a processor to generate a switching signal; and
 circuits to supply respective rated voltages to electric loads based on a battery voltage, one of the circuits comprising:
 a power switch to supply a respective one of the rated voltages to one of the electric loads; and
 a controller to turn-off said electric load in response to the switching signal.

10. The system of claim 9, wherein at least one of the circuits further includes a step-down converter to step down the battery voltage to the rated voltage of the electric load coupled to the at least one of the circuits.

11. The system of claim 10, wherein the at least one of the circuits further includes a controller configured to control an output voltage of the step-down converter based on a user input.

12. The system of claim 9, wherein the rated voltage of at least one of the electric loads is less than the battery voltage.

* * * * *